United States Patent
Smith et al.

(10) Patent No.: US 6,504,281 B1
(45) Date of Patent: Jan. 7, 2003

(54) SYNCHRONOUS MACHINE FAULT TOLERANT ARRANGEMENT

(75) Inventors: James Stanley Smith, Old Lyme, CT (US); Gregory John Kudrick, Griswold, CT (US); Abdul Rehman Bilal, Rocky Hill, CT (US)

(73) Assignee: Electric Boat Corporation, Groton, CT (US)

( * ) Notice: Subject to any disclaimer, the term of this patent is extended or adjusted under 35 U.S.C. 154(b) by 0 days.

(21) Appl. No.: 09/615,519

(22) Filed: Jul. 12, 2000

(51) Int. Cl.[7] ................................................ H02K 1/00
(52) U.S. Cl. .................. 310/190; 310/86; 310/254; 310/191
(58) Field of Search .................. 310/86, 254, 154.01, 310/152, 154.03, 154.05, 154.06, 154.12, 154.13, 154.26, 154.27, 154.28, 154.29, 154.34, 154.43, 156.08, 191, 190; 361/23

(56) References Cited

U.S. PATENT DOCUMENTS

| | | | | |
|---|---|---|---|---|
| 1,908,620 A | | 5/1933 | Zorzi ........................... 310/86 |
| 2,126,385 A | * | 8/1938 | Harbordt ...................... 310/86 |
| 2,128,544 A | | 8/1938 | Surjaninoff ................... 310/86 |
| 2,153,563 A | * | 4/1939 | Hubacker ..................... 310/86 |
| 2,506,629 A | * | 5/1950 | Bilde et al. .................. 310/254 |
| 2,657,322 A | * | 10/1953 | Holst .......................... 310/63 |
| 3,539,842 A | | 11/1970 | Weh ........................... 310/11 |
| 3,663,848 A | | 5/1972 | Lehoczky .................... 310/90 |
| 4,025,840 A | * | 5/1977 | Brissey et al. .............. 310/190 |
| 4,027,229 A | * | 5/1977 | Frink .......................... 310/190 |
| 4,190,794 A | * | 2/1980 | Mikulic ....................... 310/191 |
| 4,396,849 A | | 8/1983 | Taiani ......................... 310/104 |
| 4,578,609 A | * | 3/1986 | McCarty ................. 310/156.24 |
| 4,743,828 A | * | 5/1988 | Jahns et al. ................. 318/810 |
| 4,766,362 A | * | 8/1988 | Sadvary ...................... 310/90 |
| 5,550,417 A | | 8/1996 | Morrison et al. ........... 310/183 |
| 5,661,353 A | | 8/1997 | Erdman et al. ............. 310/86 |
| 5,990,588 A | * | 11/1999 | Kliman et al. .............. 310/86 |

* cited by examiner

*Primary Examiner*—Burton S. Mullins
(74) *Attorney, Agent, or Firm*—Baker Botts, LLP

(57) ABSTRACT

A fault tolerant synchronous machine has a stator with a core containing a plurality of phase windings, a rotor supported for rotation within the core, and a non-magnetic sleeve affixed to the stator and disposed in the space between the stator and the rotor and having a plurality of slots extending parallel to the axis of the rotor and positioned to receive high permeability inserts for shunting the flux paths of faulty stator windings to permit low power operation of a synchronous machine having faulty stator windings.

6 Claims, 7 Drawing Sheets

SYNCHRONOUS MACHINE FAULT TOLERANT ARRANGEMENT

BACKGROUND OF THE INVENTION

This invention relates to fault tolerant arrangements for synchronous machines such as synchronous motors or generators by which a high power synchronous machine is permitted to operate at lower power under faulted or grounded stator winding conditions.

The prior art does not disclose ways to permit continued lower power operation of a high power synchronous machine having faulted windings. In the Zorzi U.S. Pat. No. 1,908,620 a motor generator structure has a non-magnetic sleeve with inserts of magnetic material which are incorporated into the machine when it is assembled. There is no provision for compensating for faults in the windings in the machine.

The Surjaninoff U.S. Pat. No. 2,128,544 discloses a sleeve in the gap between the stator and the rotor of an electric motor which is made of an insulating binder material incorporating finely divided magnetic material in which the distribution of magnetic material varies throughout the sleeve to minimize flux leakage while maximizing coupling between the stator coils and the rotor. The patent to Taiani U.S. Pat. No. 4,396,849 describes a synchronous magnetic drive having a non-metallic sleeve positioned in the gap between the rotor and the stator to reduce current losses and the patent to Morrison et al. U.S. Pat. No. 5,550,417 discloses the use of electrically conductive inserts for altering the response of motor and generator structures.

SUMMARY OF THE INVENTION

Accordingly, it is an object of the present invention to provide a synchronous machine having fault tolerance which overcomes disadvantages of the prior art.

Another object of the invention is to provide a synchronous machine in which faults in stator windings can be compensated to permit continued operation of the machine.

These and other objects of the invention are attained by providing a synchronous machine having a non-magnetic sleeve installed in the air gap between the rotor and the stator of the machine and affixed to the stator in which slots are arranged to selectively receive segments of a high permeability magnetic material so that, when a stator winding fault occurs, one or more sets of segments of high permeability magnetic material can be inserted into appropriate slots to provide low reluctance shunt paths for magnetic flux from the affected windings of the faulted phase or phases, thereby minimizing flux linkage between those windings and the rotor field. This minimizes the internally generated phase voltages and consequent fault currents.

Further objects and advantages of the invention will be apparent from the reading of the following description in conjunction with the accompanying drawings, in which.

DESCRIPTION OF PREFERRED EMBODIMENTS

Figure 1:
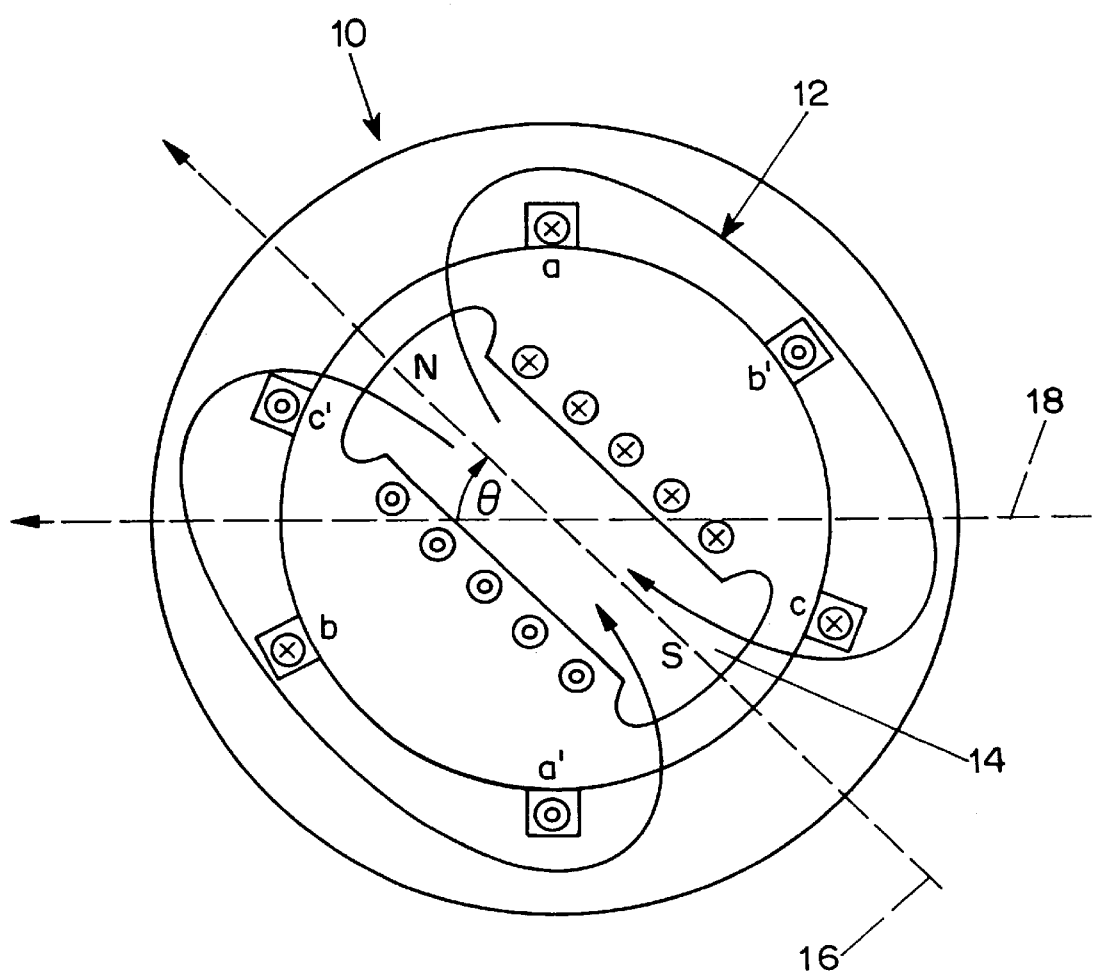
FIG. 1 is a schematic diagram illustrating the arrangement of a three-phase salient pole synchronous machine.

The two basic parts of a synchronous machine are the magnetic field structure, i.e. the rotor, which is typically either comprised of a wound field or permanent magnets (PM), and the stator, which consists of laminations forming the stator core and slots which contain slot-embedded stator coils. A synchronous machine operates, in part, on the basis of Faraday's Law. If the flux of the magnetic field structure linking a closed stator circuit changes in time, an internal excitation voltage is induced in the circuit. In FIG. 1 the stator of a salient pole three phase synchronous machine 10 has three stator coils aa', bb' and cc' providing a magnetic flux path 12, and a rotor 14 with a magnetic field 16. If the flux density in the air gap between the rotor and stator is uniform, the flux density across the plane containing the coil aa' (phase a) is given by $$B_m = 100\ /DL \tag{1}$$

where:

$\phi$=Total flux per pole produced by the field winding;

D=Diameter of the coil a'; and

L=Axial length of the coil aa'.

As the rotor 14 is moved through an angle $\theta$ with respect to the phase a axis 18, the flux linking the coil aa' is given by $\lambda = N\phi \cos \theta$, where N is the number of turns of coil aa'. If the rotor rotates at a constant velocity $d\theta/dt=\omega$, the electromotive force (EMF) induced in aa' is $$e_a = -d\lambda/dt = -d\lambda/d\theta * d\theta/dt = N\phi \sin \theta * d\theta/dt. \tag{2}$$

Substituting $d\theta/dt=\omega=2\pi f$ and $\theta=\omega t$, into Equation (2) yields $$e_a = \omega N\phi \sin \omega t \tag{3}$$

Equation (3) describes the relationship between induced voltage and total flux per pole produced by the field winding.

Because the phases b and c are displaced from phase a by −120° and +120° respectively, the corresponding voltages may be written as $$e_b = \omega N\phi \sin(\omega t - 120°)$$

$$e_c = \omega N\phi \sin(\omega t + 120°)$$

Figure 2:
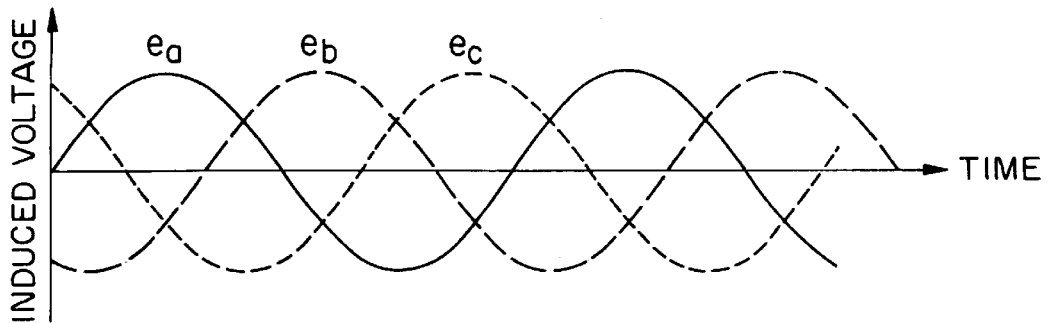
FIG. 2 is a graphical representation showing a three-phase voltage produced by a three-phase synchronous machine.

These voltages are shown in the graph of FIG. 2 by the curves $e_a$, $e_b$ and $e_c$.

Several fault conditions can occur within a synchronous machine's stator winding. In terms of decreasing severity, the fault conditions are:

(1) a three phase fault;
(2) a double line to ground fault;
(3) a line to line fault;
(4) a single line to ground fault; and
(5) a phase coil turn to turn fault.

Although a three phase fault is the least likely to occur, it will be discussed here since it presents the worst case fault condition.

In conventional synchronous machines continuous operation of a machine with faulted stator windings is prohibited since the field flux, which is necessary to produce electrical (generator) or mechanical (motor) power, induces a voltage in the faulted machine windings as previously described. The induced voltage behind the low impedance fault path creates high fault currents between phases which, except for a low phase resistance, are only limited by the synchronous reactance ($X_s$) between the faulted phases of the machine's stator.

Figure 3:
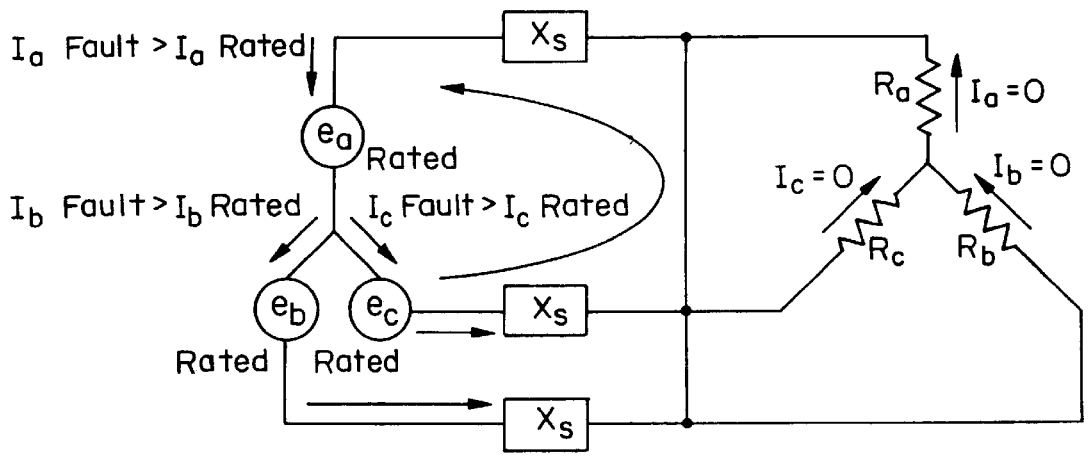
FIG. 3 is a schematic diagram showing a three-phase stator winding fault in a synchronous machine.

A three phase fault condition is shown in FIG. 3 in which the faults produce currents $I_a$, $I_b$, and $I_c$ which are greater than the currents for which the coils a, b and c are rated. Such high currents with ensuing electrical arcing, thermal damage or both, while attempting to continue producing power can further propagate the fault.

The present invention mitigates this problem by partially shunting the rotor field flux path from the affected phase or phases of the stator. This reduces the flux linkage between the rotor and stator and minimizes the induced voltage and resulting current flow through the faulted phase windings, allowing lower power operation of a multiphase synchronous machine which is limited by the designed capability of the remaining phases.

In a preferred embodiment of a fault tolerant synchronous machine in accordance with the invention, the stator is wound with 3N phases, where $N \geq 2$ (i.e., 6, 9, 12 phases, etc.), resulting in N three phase groups (i.e., 2, 3, 4 etc.). Each phase group consists of a three phase winding set. By not connecting the three phase group neutrals, independent three phase groups can be incorporated within the same stator core. Additionally, this preferred embodiment minimizes magnetic coupling of the three phase groups. This can be achieved by a winding arrangement such that no stator slot contains conductors from two different phase groups as in a more conventional double layer stator winding for higher power synchronous machines. Examples of double layer stator windings are described in S. A. Nasar and L. E. Unnewehr, *Electromechanics and Electric Machines*, 2nd Edition, John Wiley & Sons, New York, 1983.

Figure 4:
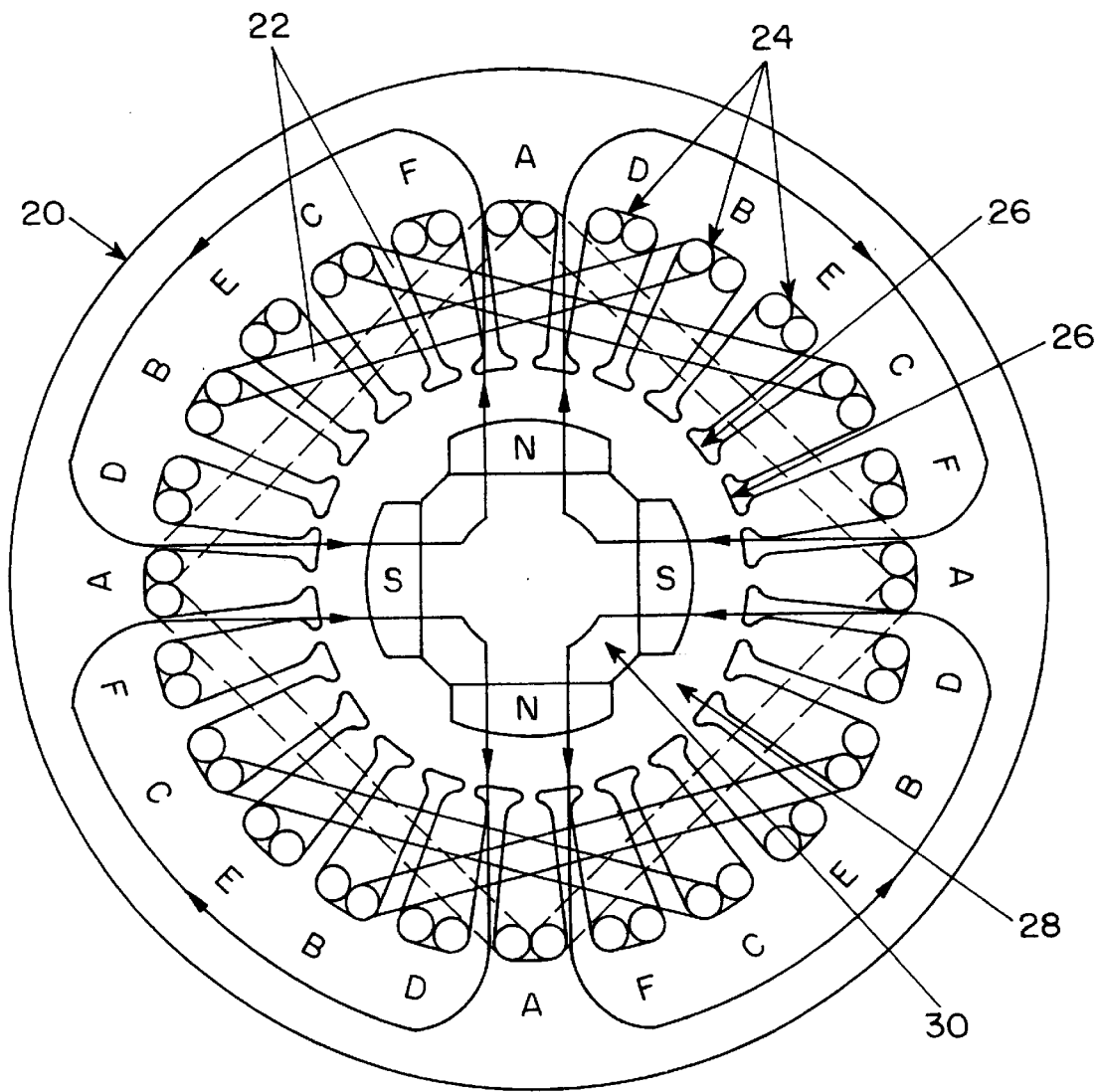
FIG. 4 is a schematic illustration showing the winding configuration for a six phase, four pole synchronous machine.

For simplicity, the winding configuration for only phases ABC of a two phase group (six phase), four pole machine with one coil per pole per phase is shown in FIG. 4 in which a stator core 20 has stator windings 22 extending through armature slots 24 with teeth 26 extending between the adjacent slots 24. An air gap 28 exists between the core teeth 26 and a rotor 30 which is centrally supported in the core.

Figure 5A:
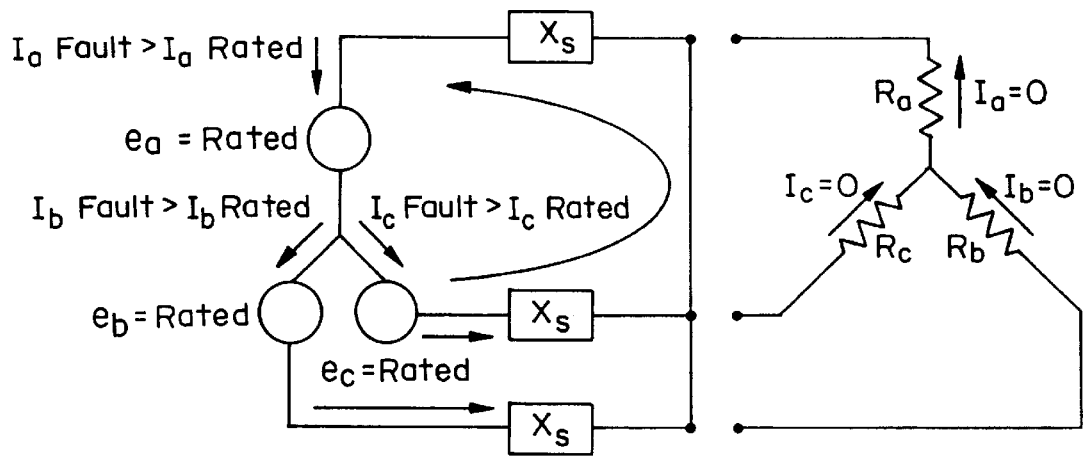
FIG. 5A is a schematic diagram showing the currents produced in three faulted windings, i.e., phases a, b and c of a six phase synchronous machine.
Figure 5B:
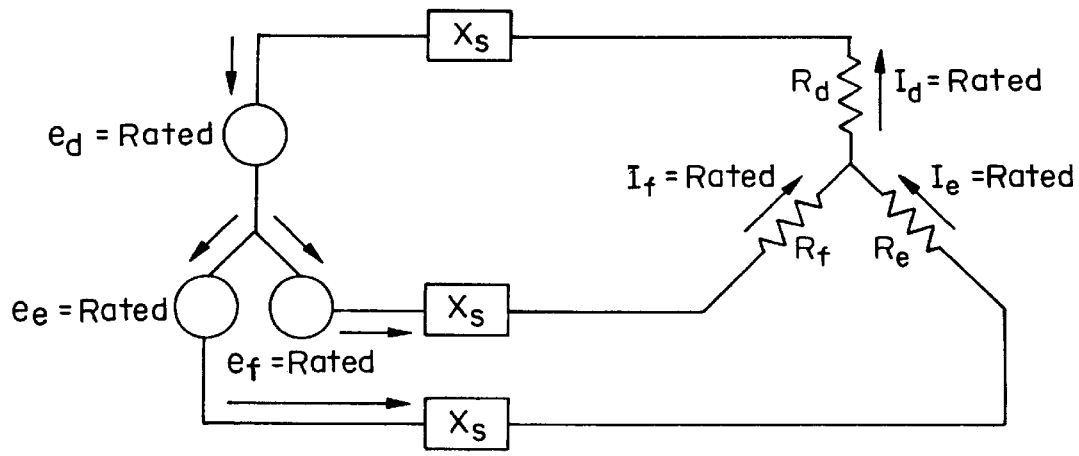
FIG. 5B is a schematic diagram showing the currents in the unfaulted stator windings, i.e., phases d, e and f in a six phase synchronous machine.

FIGS. 5A and 5B show the effect of a three phase fault in phase group ABC of a six phase machine. As the machine's field remains energized and rotation continues, fault current is produced in the phase windings ABC as shown in FIG. 5A while the other phases DEF attempt to continue producing power as shown in FIG. 5B. Indications of relative currents and internal generated voltages are shown in FIG. 5A and 5B. To allow low power operation for the faulted three phase winding condition or any of the other fault conditions previously described, it is necessary to reduce the internal generated voltage within the ABC phase group to the lowest magnitude possible. This is accomplished by minimizing the flux linkage between the affected stator windings and the rotor field as governed by Equation (3) above.

In accordance with the invention this linkage is minimized by selectively providing an alternate low reluctance magnetic flux path which shunts the flux away from the vicinity of the laminated stator core and teeth of the affected phases.

Figure 6:
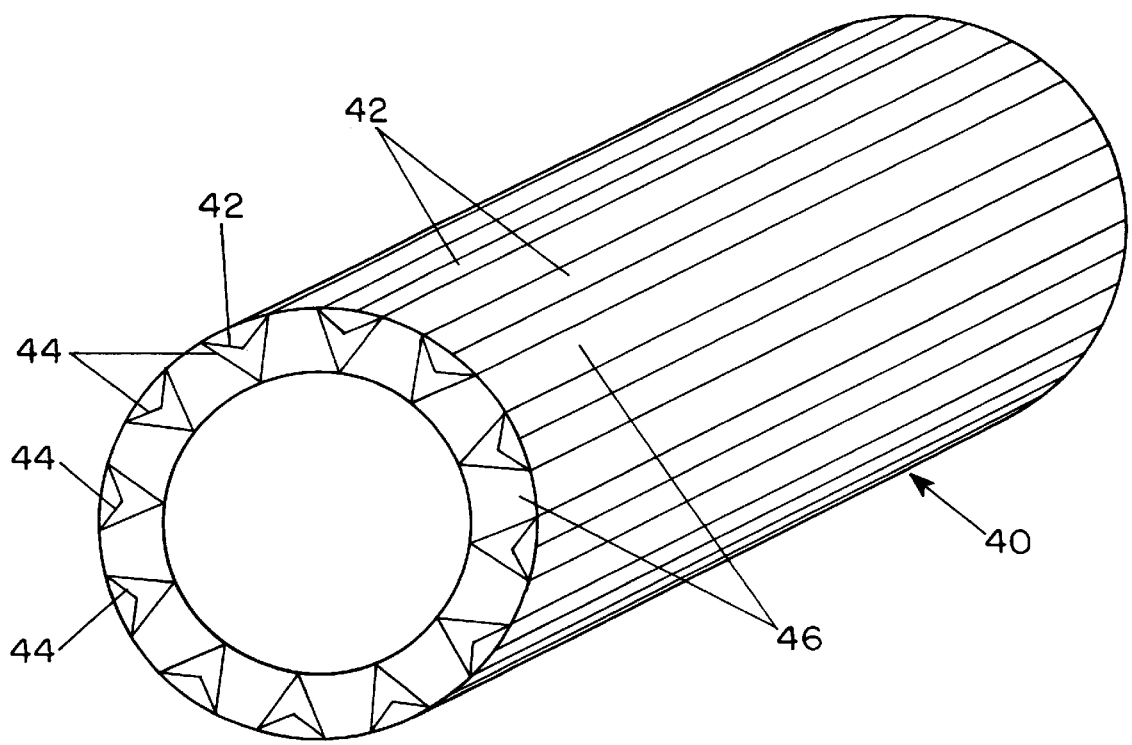
FIG. 6 is a perspective view illustrating a representative embodiment of a non-magnetic sleeve for use in a synchronous machine according to the invention and provided with high permeability inserts.
Figure 7A:
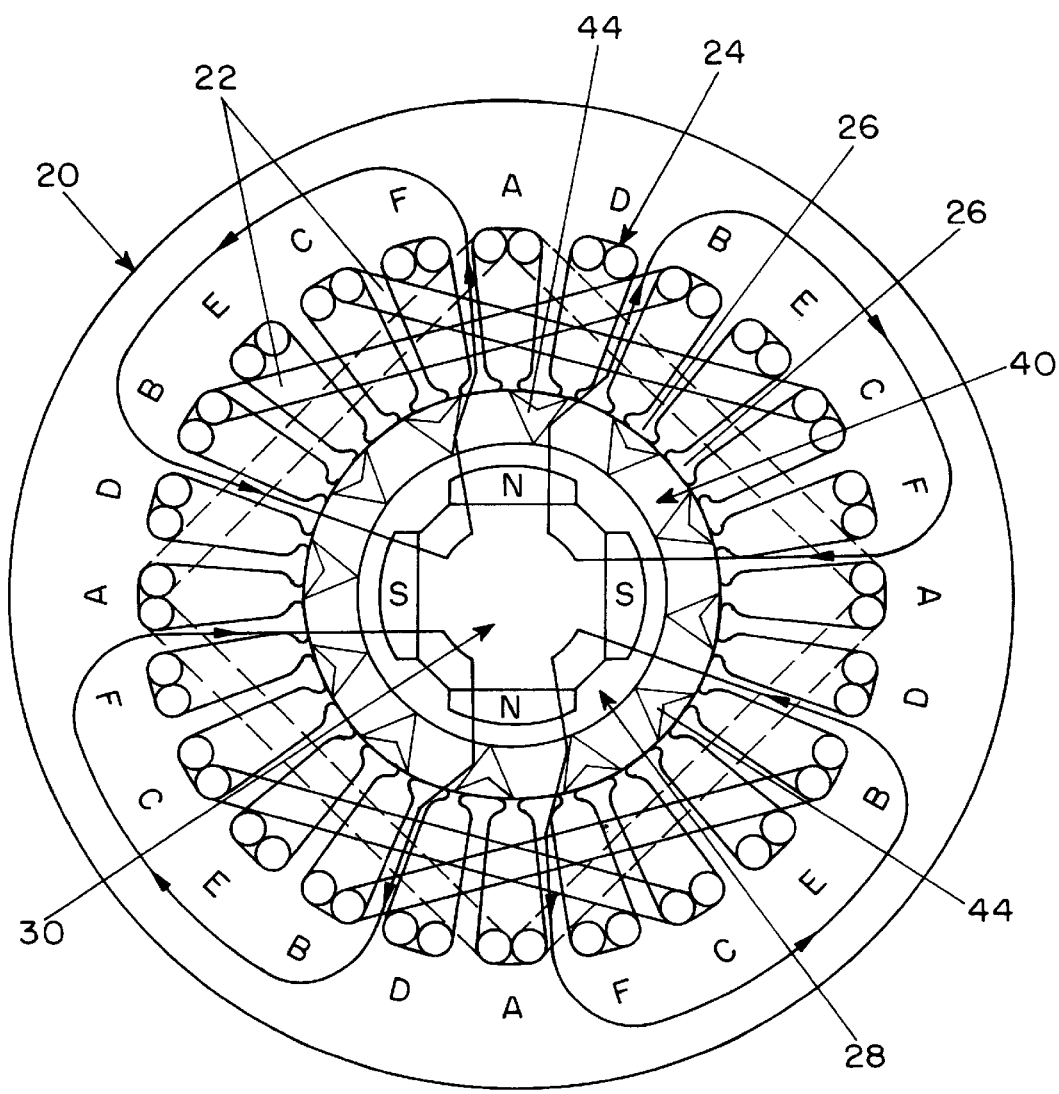
FIG. 7A is a schematic view illustrating a faulted synchronous machine having shunted flux paths.

For this purpose a non-magnetic sleeve 40, shown in FIG. 6, is provided within the air gap 28 and is attached to the stator core 20 as shown in FIG. 7A. A non-magnetic sleeve in this region is typically used in "canned" or wetted motor applications. This application is possible here since synchronous machines have the design flexibility available to accommodate larger air gaps and the mechanical clearances necessary for the provision of the sleeve 40. The non-magnetic sleeve 40 has an array of slots 42 uniformly distributed around its periphery to selectively receive corresponding segments 44 of a high permeability magnetic material such as Permalloy with intervening segments 46 of non-magnetic material, as shown in FIG. 6. After a fault occurs the machine is stopped and segments 44 of high permeability material are selectively inserted in the appropriate slots to shunt the flux fields linking the faulty windings. Since the non-magnetic sleeve is permanently installed at the time of synchronous machine manufacture, minimal disassembly of the machine is required for insertion of the appropriate segments as compared to the disassembly which would be necessary for insertion of an assembled sleeve. Additionally, this method minimizes the requirements for spare parts since all of the high permeability segments 44 are identical. Also, due to the relatively small width of the segments 44, less storage space is required than would be necessary for a fully assembled sleeve 40.

Figure 7B:
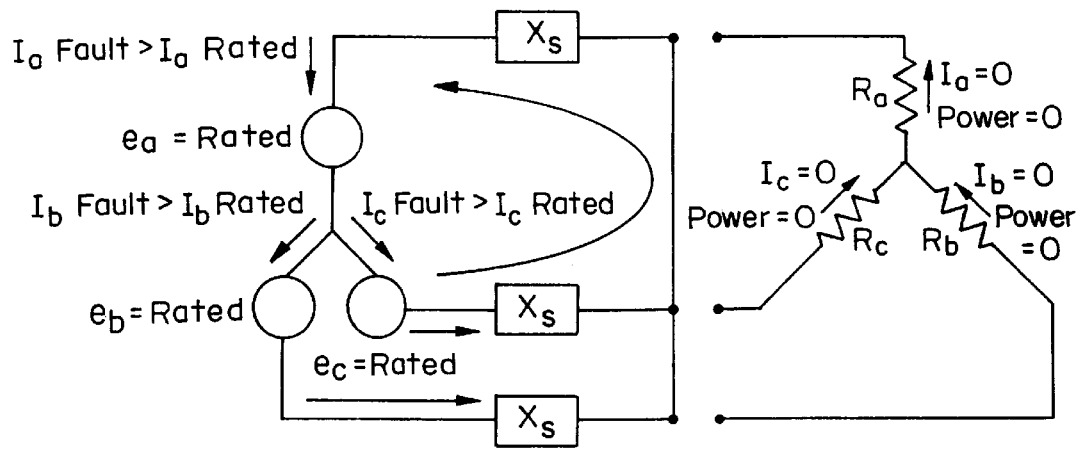
FIG. 7B is a schematic circuit diagram showing the effect of shunting the flux paths of the faulted windings in the six phase synchronous machine of FIG. 7A.
Figure 7C:
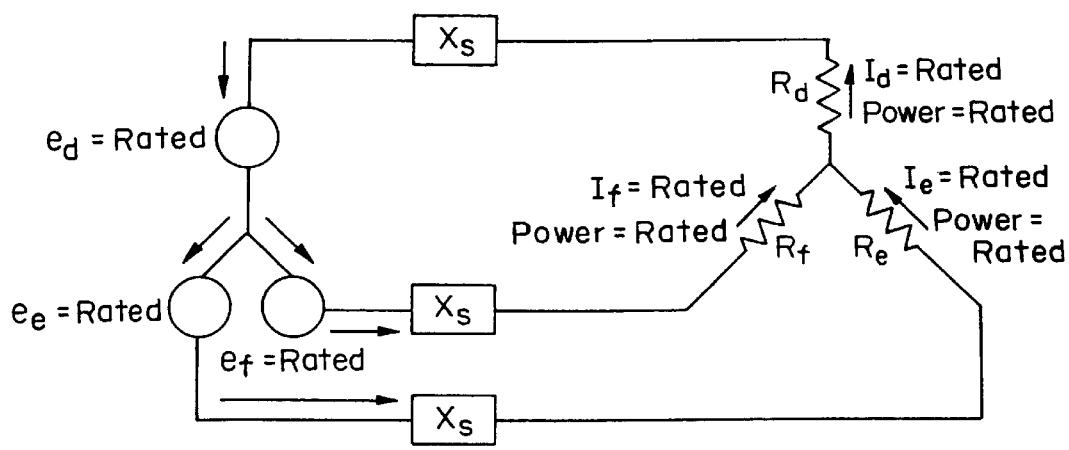
FIG. 7C is a schematic diagram showing the currents in the unfaulted windings which allow reduced power operation of the six phase synchronous machine of FIG. 7A having flux shunted from the faulted windings.

The high permeability material provides a low reluctance path for the magnetic flux. Therefore, arranging the segments 44 to span the teeth of the faulted three phase winding set maximizes the flux that can be shunted from the stator teeth of the affected phase group, minimizing the flux linkage with the rotor field and minimizing the internally generated phase voltage and fault current. Shunting the flux path, which reduces the fault current magnitude, minimizes the potential for fault propagation in the affected phase group and allows the six phase machine of FIG. 7A to be operated at reduced power as two three phase machines as shown in FIGS. 7B and FIG. 7C. FIG. 7B shows the effect of shunting faulted windings in reducing the internally generated current and FIG. 7C shows the operation of the unshunted windings.

This invention applies to both wound field and permanent magnet (PM) synchronous machines. It also provides a level of electric machine resiliency. Providing capability for reduced power operation minimizes the need for redundant machines. This reduces overall electric system cost, size, weight and life-cycle requirements. Limited operation capability is especially important for applications considered critical, such as maintaining power generation and electric propulsion capability for ships operating in remote locations.

Although the invention has been described herein with reference to specific embodiments, many modifications and variations therein will readily occur to those skilled in the art. Accordingly, all such variations and modifications are included within the intended scope of the invention.

We claim:

1. A fault tolerant synchronous machine comprising:
   a stator having a core member and a plurality of phase windings disposed in a plurality of angularly spaced slots in the core member with teeth extending between adjacent slots;

a rotor supported for rotation within the stator and spaced therefrom by a gap; and a non-magnetic sleeve within the gap surrounding the rotor and affixed to the stator and having a plurality of slots extending parallel to the axis of the rotor, each slot being angularly positioned to span adjacent teeth defining a slot in the core member;

the slots in the sleeve being free of magnetic material to permit magnetic flux from the rotor to pass to selected phase windings in the stator slots without deviation by the presence of magnetic material and to shunt magnetic flux from selected phase windings in the stator slots upon insertion of high permeability magnetic material in corresponding slots in the nonmagnetic sleeve.

2. A fault tolerant synchronous machine according to claim 1 wherein the stator is wound with 3N phases where $N \geq$ to 2, producing N phase groups, and each phase group consists of a three phase winding.

3. A fault tolerant synchronous machine according to claim 2 wherein each phase group has a neutral and the phase group neutrals are not connected.

4. A fault tolerant synchronous machine according to claim 1 wherein the phase windings are arranged in core slots so that no stator slot contains conductors from two different phases.

5. A fault tolerant synchronous machine according to claim 1 wherein one of the plurality of phase windings has become faulted and a magnetic member is provided in a slot in the non-magnetic sleeve to shunt magnetic flux from the rotor away from the faulted phase winding.

6. A fault tolerant synchronous machine according to claim 5 wherein the magnetic member has suitably high magnetic permeability for the use of the machine.

* * * * *